United States Patent [15] 3,680,176
Calhoun, Sr. [45] Aug. 1, 1972

[54] GIN STAND
[72] Inventor: William L. Calhoun, Sr., P.O. Box 517, Rayville, La. 71269
[22] Filed: April 1, 1970
[21] Appl. No.: 24,787

[52] U.S. Cl. .................................................. 19/63
[51] Int. Cl. ............................................. D01b 1/08
[58] Field of Search ...................... 19/55, 56, 62, 63

[56] References Cited
UNITED STATES PATENTS
255,926  4/1882  Brooks ............................. 19/63
2,104,889  1/1938  Struen ........................... 19/62 R
3,448,493  6/1969  Calhoun .......................... 19/63

Primary Examiner—Dorsey Newton
Attorney—Cushman, Darby & Cushman

[57] ABSTRACT

An improved gin stand device is provided which includes an eccentric saw and mandril combination. The eccentric combination is constructed to include saw blades concentrically mounted on a mandril which is itself mounted on an eccentric axis of rotation.

This application is related to the subject matter of U.S. Pat. No. 3,448,493.

4 Claims, 3 Drawing Figures

INVENTOR.
William L. Calhoun, Sr.
BY
Cushman, Darby & Cushman
ATTORNEYS

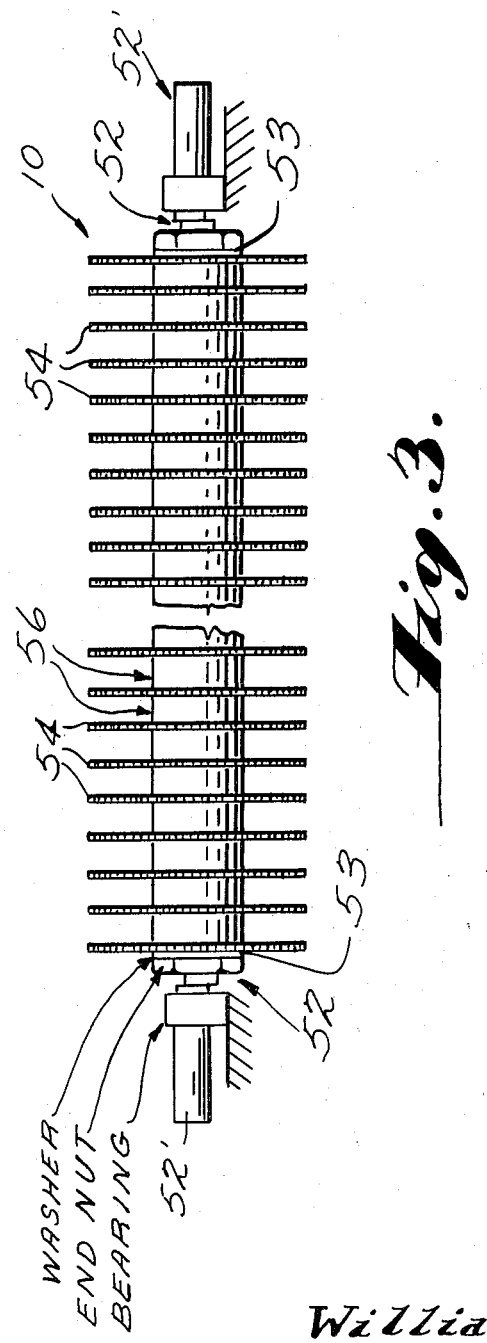

GIN STAND

BACKGROUND AND BRIEF DESCRIPTION OF INVENTION

This invention relates to cotton gin stands, and particularly to improvements for increasing the capacity and operation of gin stands, especially those manufactured in prior years, to make them more competitive with modern high-capacity stands. However, the invention also relates to new gin stands, as well.

In ginning harvested cotton with gin stands, several different types of operating difficulties are frequently encountered. As pointed out in U.S. Pat. No. 3,448,493, one of the most common difficulties is known in the trade as "backlash". This difficulty begins when the saw teeth of the gin come in contact with some substance, usually foreign matter or wet cotton, that causes a small tuft of lint to pass the doffing point still attached to the saw, and to be deposited on the other or under side of the lower portion of the ginning ribs through which the tuft may pass. In huller type gins, these tufts or wads wedge between the lower huller breast or rib gaps. If those tufts are not immediately dislodged, the ginned seed falling from the roll becomes entangled with the tufts of lint making it impossible for the seeded tufts or mass to pass through the lower huller rib gaps. Consequently, heat is created by friction with the rotating saw. At this point, however, the backlash problem is usually detected by operators of the gin stand, and after disengaging the gin stand and stopping the ginning operation the wad of seeded tufts or mass of lint that was not doffed, is removed manually. But if instead the backlash condition is allowed to exist even for a relatively short time, the wad continues to grow at a progressive rate until the excessive heat of friction generated by the turning saw leads to combustion, which nearly always causes the entire lint system to be inflamed. Even if the situation is created before combustion but allowed to exist for too long a time, the generated frictional heat is usually sufficient to cause a warp in one or more of the saw blades, leading to shutdown and replacement of the entire saw while the warped blade or blades thereof are replaced.

It is an important object of this invention to prevent backlash and the possible consequences thereof.

Another operating difficulty which generally is less frequent than backlash but nevertheless occurs frequently, is the creating of an upper ginning rib choke. This problem is becoming more of a nuisance recently with the more widespread use of mechanical cotton harvesters. Rib chokes are usually caused by what is called "spindle twist" which is formed by allowing a mechanical cotton harvester to operate improperly adjusted, resulting in a mass of tangled cotton fibers (usually very moist) small enough to pass the upper huller rib gaps but too large to pass through the upper gin rib gaps. A ginning rib choke occurs when a wad of such tangled fibers forms or arrives at and above the gap where the saw teeth pass between the ginning ribs, i.e., at the ginning point, and if left unattended grows large enough to prevent the seed roll from turning, thereby stopping the ginning process completely. When this happens, the flow of cotton to the gin stand must be stopped by the operators, and the stand must be disengaged in order to remove the chokage manually.

It is therefore another important object of this invention to prevent ginning rib chokes and the resultant down times normally caused thereby.

The foregoing objects are accomplished in accordance with this invention by employing in a cotton gin an improved eccentric saw. Cotton gin saws which have successive blades or groups of blades disposed eccentrically on their mandril have been patented heretofore; see Brooks U.S. Pat. No. 255,926 and Calhoun U.S. Pat. No. 3,448,493. In the Brooks arrangement, the saw blades are arranged so that their longest radius or maximum throw is 90° apart, with four saw blades making up successive groups of blades so arranged. Such an arrangement however does not lend itself to increasing the capacity of gin stands nor the rotation of speed of the seed roll therein, as does the present invention. Better roll agitation is accomplished by this invention because of the arrangement and shape of the saw cylinder, viewed as a whole, and as related to the roll box of a gin stand. In accordance with the present invention an improved arrangement of eccentric saw blades is provided, and the improved arrangement includes either (a) all saw blades on a mandril being eccentric in a common direction of throw; or (b) the placement of all saw blades concentrically on a mandril but with the mandril itself mounted to rotate on an eccentric axis. Thus, this arrangement provides for many of the benefits described and claimed in U.S. Pat. No. 3,448,493 but without requiring an offsetting disposition of any individual blade relative to remaining blades on the mandril.

Other features and advantages of the present application will become apparent in the more detailed discussion which follows. In that discussion reference will be made to the accompanying drawings as briefly described below.

BRIEF DESCRIPTION OF DRAWINGS

FIG. 3 is an elevational view of a second embodiment of a ginning saw wherein saw blades are concentrically mounted on an eccentrically mounted mandril.

DETAILED DESCRIPTION OF INVENTION

Figure 1:
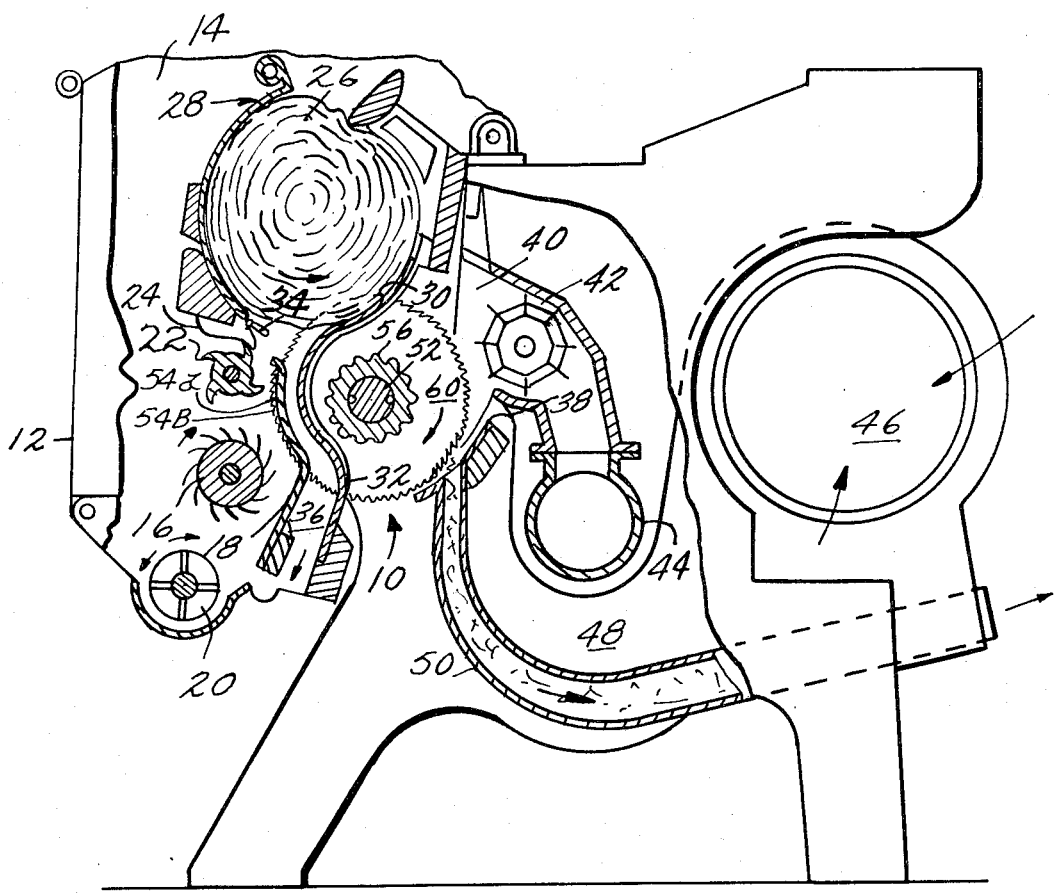
FIG. 1 is a diagrammatic representation of a cross section of a gin stand.

The cotton gin stand of FIG. 1 is generally conventional, except for the saw cylinder 10 and its new manner of cooperating with the other elements of the gin stand in order to improve the total operation of the gin. The gin stand illustrated is of the huller type and includes a conventional breast assembly 12 at the huller front 14 through which harvested seed cotton is received. As the seed cotton rebounds against the front wall of the gin stand, it strikes picker roller 16. This throws the seed cotton against the teeth of the blades of ginning saw 10, which protrude slightly between the lower huller ribs 18. In turn, the impinged seed cotton is carried by the teeth of the gin saw upward in a clockwise direction. Foreign matter which has been dislodged at this point from the seed cotton is carried around by the picker roller 16 in a clockwise direction. From under the picker roller, the foreign matter is carried out of the machine by a trash conveyor 20, of the auger type for example. On the other hand, seed cotton is fed from its point of impingement on the saw past the auxiliary stripper roller 22, which aids in removing wads of cotton that may collect in the gap between the lower huller ribs 18 and the upper huller ribs 24. The feeding process through this gap forms a seed roll 26 in roll box 28. Clockwise movement of saw 10 operates to rotate the seed roll 26 in a counterclockwise direction and the ginning process occurs at the usual ginning point 30 where the ginning ribs 32 cross the teeth of saw 10. As the ginning process continues, the amount of ginned seed in the roll box continues to increase until the more completely ginned seed begins to fall out past the seed lambrequin 34 and downward through space 36 between the lower huller ribs 18 and the ginning ribs 32.

The lint which is separated from the seed at the ginning point 30 passes through the ginning ribs 32 entrained on the saw teeth, continuing in a clockwise path toward an air blast nozzle 38 through a moting area 40. There, motes are slung off the saw cylinder past rubber flighted mote roller 42 and out of the gin stand through a mote discharge pipe 44. After the moting process, the lint cotton still on the saw teeth passes in close proximity to the air blast nozzle 38 where the pressurized induced air currents from the air intake connection 46 via duct 48 remove or doff the cotton from the saw teeth and carry it out of the gin stand through the lint discharge duct 50.

With the foregoing general understanding of the operation of the gin stand of this invention, it will be recalled by reference to the preamble hereof that operating difficulties known as backlash and ginning rib chokages are frequently encountered in conventional equipment, but are reduced if not eliminated by the present invention. The ginning rib type chokes, which are caused, as above explained, are wads of tangled cotton fibers which form at the gaps between the ginning ribs at the ginning point 30. If these wads are allowed to continue growing, they will raise the seed roll 20 sufficiently to stop the ginning process completely. The present invention prevents such stoppage and substantially reduces the number of rib chokes by use of improved eccentric saw mounting principles, as more fully explained below.

Backlashes are also substantially reduced if not eliminated by this invention. A backlash occurs, as previously described, when a small lint tuft passes the doffing nozzle 38 still attached to the saw. This tuft passes on through the lower ginning ribs 32 but cotton seed dropping into space 36 becomes entangled therewith making it impossible for the tufts to pass through the gaps of the lower huller ribs 18. As above indicated, such seeded tufts or wads that are not doffed may eventually grow into a backlash situation causing a combustion due to the friction of the wads with the rotating saw. The eccentric saw arrangements of this invention, however, tend to obviate backlash problems, as described below.

Figure 2:
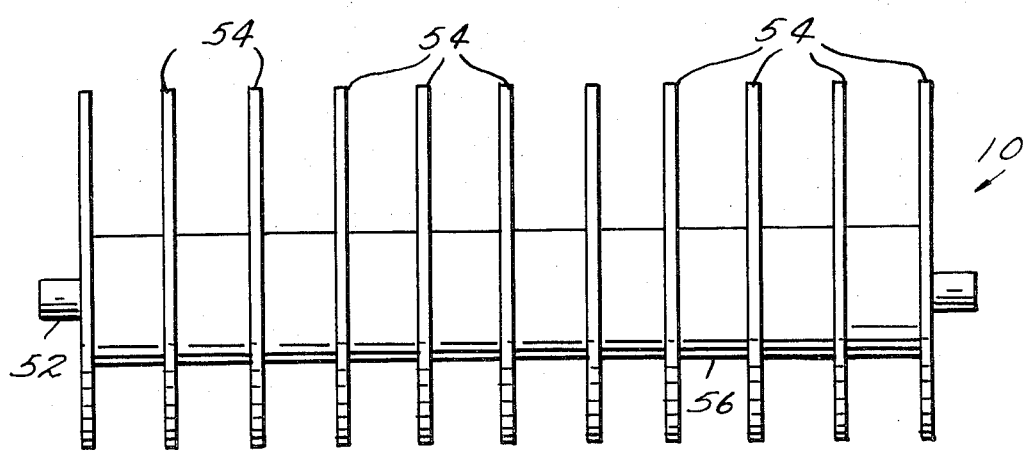
FIG. 2 is an elevational view of one embodiment of a ginning saw constructed in accordance with this invention wherein all saw blades are eccentrically mounted in a common direction.

In the FIG. 2 embodiment, the improved saw cylinder or saw 10 of this invention includes a mandril 52 and a multiplicity of circular saw blades 54 spaced at conventional intervals by the usual peripherally corrugated spacers 56. In this embodiment, all circular saws 54 of a saw cylinder are mounted so that the cylinder, when viewed as a whole, has a common direction of maximum throw for all blades. This may be accomplished by mounting all blades 54 eccentrically on a mandril 52, and with all of the eccentrically mounted blades having a common direction of maximum throw, as shown in FIG. 2.

Alternatively, as shown in FIG. 3, all of the circular saw blades 54 can be concentrically mounted on a mandril 52 which is provided with eccentrically positioned extensions 52'. The extensions 52' are eccentrically mounted along an eccentric axis which is parallel to the central longitudinal axis of the mandril 52, and in this way the saw cylinder 10 is rotated on an eccentric axis which effectively gives all of the saw blades 54, making up the cylinder, a common direction of maximum throw. Of course, it is to be understood that the illustrations of FIGS. 2 and 3 are somewhat exaggerated in their depictions of maximum throw for individual saw blades and for the cylinder as a whole. The maximum throw for all of the saw blades of FIGS. 2 and 3 may be approximately one-eighth inch in a typical construction. The number of blades 54 and spacers 56 which are utilized in any particular construction may also vary from the numbers shown in FIGS. 2 and 3.

With the embodiments of FIGS. 2 and 3 there is no sequence of maximum throw between successive saw blades, and this results in a saw cylinder having an overall eccentric throw when it is rotated. It has been found that such saw cylinder constructions have a substantial effect upon the cross-sectional shape of a seed roll in a roll box, and the shape of the seed roll is continually changed as the saw cylinder is rotated. By continually changing the shape of a seed roll, there is a more rapid removal of seeds from the roll, and choking and backlash are substantially reduced, if not eliminated.

In a typical construction of the FIG. 3 arrangement, conventional saw blades are concentrically mounted on a mandril constructed with both of its bearing surfaces and end shafts eccentric in a common angle with respect to the middle portion of the mandril. The middle portion of the mandril holds the saw blades, spacers, and end nuts and washers, as shown in FIG. 3. The centerline of the mandril and the centerline of the end shafts are one-sixteenth inch apart, causing opposite peripheries of the saws to have a one-eighth inch throw. Spacers 53 may be counterweighted with babbit to balance the eccentrically mounted saw, if desired. However, the eccentric disposition of blades or of the saw does not lead to any imbalance problems in actual operation. In fact, there is no vibration at all in normal operation of either of the saws of FIGS. 2 or 3.

Whatever the reasons are that cause the saw cylinder of this invention to improve the operation of a gin stand constructed in accordance with this invention, it has been determined that the capacity of a gin stand is materially increased and all kinds of chokages are drastically reduced if not substantially eliminated, when this invention is employed.

It has been above indicated that backlash and gin rib chokages are substantially eliminated by this invention, but furthermore it has been determined that there is substantial improvement when the gin stand is equipped with an air blast type of doffer, as illustrated in FIG. 1 by the air blast nozzle 38. While a brush type doffing system may be employed, air blast doffing is preferred from the standpoint of not only allowing the advantage of superior overhead moting but also the faster ginning than is normally attributable to brush type gin stands.

A still further advantage which this invention contributes is the obviating of chokages which are particularly encountered in the type of gin stands that employ a solid or one-piece huller rib, as disclosed for example in Ellis U.S. Pat. No. 410,082 and in my prior U.S. Pat No. 2,214,497, for example, as opposed to the divided or split huller rib such as disclosed in FIG. 1 hereof and in the Ellis U.S. Pat. No. 249,913. In ginning damp or very rough cotton, some difficulty is encountered in the one-piece huller rib gin stands, and to some much less degree in the split or huller rib stand, with seed cotton lodging in the gaps through which it must pass to enter the roll box. If the wad becomes large enough and is not removed by any equipment such as the auxiliary stripper roller 22, the wad prevents seed cotton from entering the roll box, thereby forming a roll box choke. Incoming cotton must fall back in the gin front and eventually the picker roller 16 and stripper roller 22 will be clogged. As in the event of backlash and ginning rib chokes, the feeding chokages caused in this manner must also be removed manually, in the absence of the present invention, causing a loss of much operating time. The present invention, however, aids in overcoming the problems of all chokages by helping to prevent their occurrence.

From the foregoing it is apparent that this invention has provided for all of the objects and advantages herein mentioned. Still further objects and advantages of the invention, and even modifications thereof, will become apparent to those of ordinary skill in the art upon reading this disclosure. However, it is intended that this disclosure be considered exemplary and not limitative, the invention being defined by the appended claims.

What is claimed is:

1. In a cotton gin stand having a gin saw including a mandril carrying a multiplicity of circular saw blades secured at equal spacings along the mandril, the improvement comprising:
    each of said saw blades being secured eccentrically of said mandril with a substantially equal maximum throw for each blade and with all of said blades having a maximum throw in a common direction.

2. The improvement of claim 1 wherein the maximum throw for all of said blades, as measured from opposite peripheries, is approximately one-eighth inch.

3. In a cotton gin stand having a gin saw including a mandril carrying a multiplicity of circular saw blades secured at equal spacings along the mandril and concentrically mounted thereon, the improvement comprising:
    means for mounting and rotating said gin saw on an eccentric axis which is parallel to a central longitudinal axis of said mandril, said means for mounting and rotating including extensions positioned at opposite ends of said mandril on a common axis which is offset from the central longitudinal axis of the mandril, whereby said saw blades are effectively rotated eccentrically relative to a seed roll box contained in said gin stand.

4. The improvement of claim 3 wherein said extensions include bearing surfaces at the ends of the mandril for mounting the gin saw on said eccentric axis.

* * * * *